United States Patent [19]

Sanders

[11] Patent Number: 4,715,732
[45] Date of Patent: Dec. 29, 1987

[54] BEARING ASSEMBLIES FOR MOTORS

[75] Inventor: Anthony J. Sanders, Darlington, England

[73] Assignee: Black & Decker Inc., Newark, Del.

[21] Appl. No.: 924,635

[22] Filed: Oct. 29, 1986

[30] Foreign Application Priority Data

Oct. 31, 1985 [GB] United Kingdom ............... 8526837

[51] Int. Cl.$^4$ .................. F16C 37/00; F16C 27/06; F16C 33/02; H02K 5/16
[52] U.S. Cl. .................................. 384/320; 384/220; 384/277; 384/476; 384/900; 310/90
[58] Field of Search ............... 384/215, 220, 222, 278, 384/277, 313–321, 535, 536, 476, 900; 310/90

[56] References Cited

U.S. PATENT DOCUMENTS

| | | | |
|---|---|---|---|
| 2,493,160 | 1/1950 | Morley | 384/320 |
| 3,193,336 | 7/1965 | Moscardini | 384/321 |
| 3,311,293 | 3/1967 | Moffatt | 384/320 X |
| 3,459,978 | 8/1969 | Trucks et al. | 310/90 X |
| 3,818,255 | 6/1974 | Wagner | 310/90 X |
| 3,959,677 | 5/1976 | Grieb | 384/321 X |
| 4,435,661 | 3/1984 | Witten | 384/220 X |
| 4,635,352 | 1/1987 | Uhen | 310/90 X |

FOREIGN PATENT DOCUMENTS 119225 9/1980 Japan ................................ 384/900

Primary Examiner—Stuart S. Levy
Assistant Examiner—Thomas R. Hannon
Attorney, Agent, or Firm—Edward D. Murphy; Harold Weinstein; Edward D. C. Bartlett

[57] ABSTRACT

An air cooled bearing assembly for the armature shaft of an electric motor comprises a heat sink with an axial bore and spaced outwardly extending fins along its external surface. The fins are of a greater depth over part of their length and the junction between the parts of different fin depth is round to form a seating for a resilient mounting member. Located in the bore is a bearing sleeve which is an interference fit in the bore.

16 Claims, 41 Drawing Figures

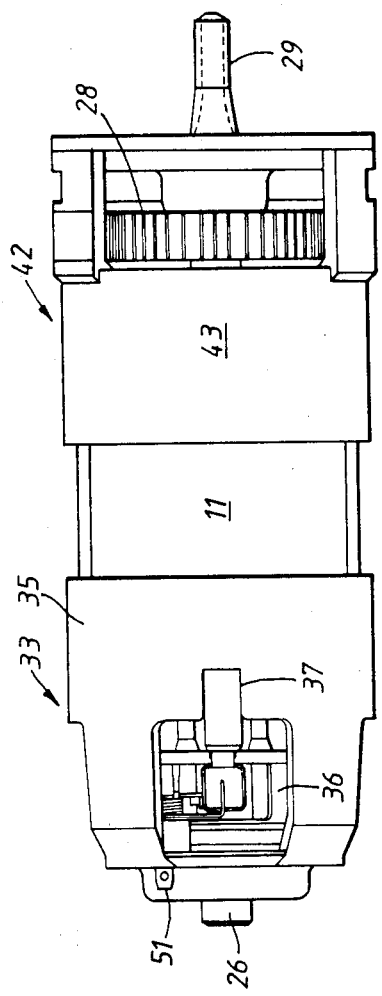
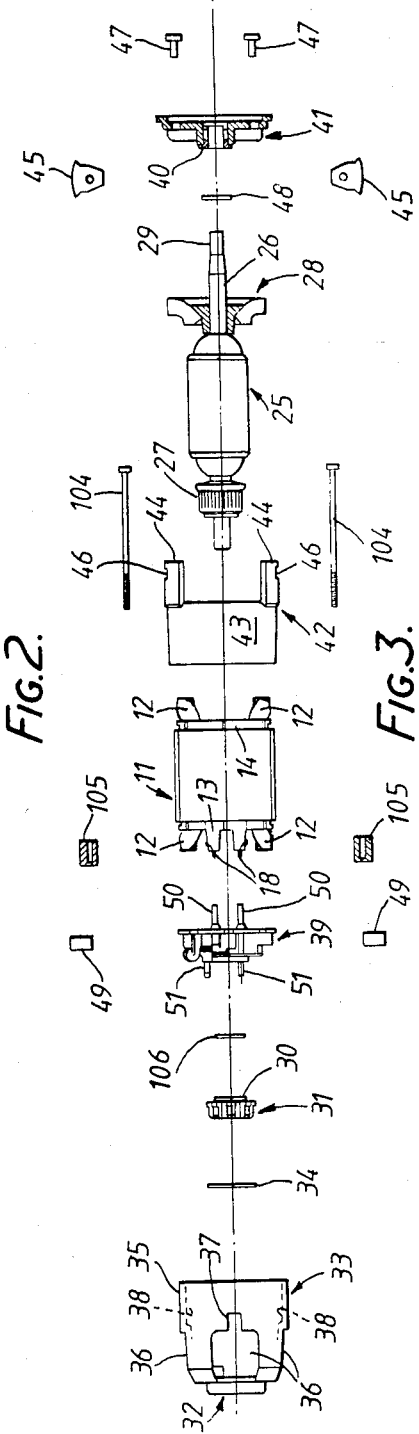
Fig.2.
Fig.3.

BEARING ASSEMBLIES FOR MOTORS

FIELD OF THE INVENTION

This invention relates to bearing assemblies for rotatable members and has particular but not exclusive reference to bearing assemblies for the armature shafts of electric motors.

BACKGROUND OF THE INVENTION

The invention relates especially to bearing assemblies including plain bearings. It is found that, in use, the bearing may become overheated unless steps are taken to dissipate the heat generated and it is an object of the present invention to provide a bearing assembly with effective heat dissipation.

SUMMARY OF THE INVENTION

According to the present invention, a bearing assembly comprises a bearing mounted in the bore of a mounting sleeve having a plurality of spaced, external, radially-extending fins.

The fins may be of a reduced height over a part of their axial length as compared with the fins height over the remainder of the axial length.

The junction between the parts of reduced height and the remainder of the fins is adapted to form a seating surface for an annular mounting member by which the mounting sleeve is mounted.

The mounting member is preferably of a resilient material.

The assembly may further comprise a member having an orifice, the member being contoured round the orifice in a manner such that there is provided a surface for locating the mounting member, the bearing assembly being located in the orifice and being supported therein by the mounting member.

The bearing may be a bearing sleeve which may be an interference fit in the bore.

The invention also envisages an electric motor including an armature mounted upon an armature shaft, one end of which is rotatably supported in a bearing assembly embodying the invention as above stated.

The motor may be incorporated in a power tool which may be a hand-held power tool.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 is a side view of a motor assembly, on a different scale,

FIG. 3 is an exploded view, on a different scale, of the motor assembly of FIG. 2.

DETAILED DESCRIPTION OF THE PREFERRED EMBODIMENT

Figure 1:
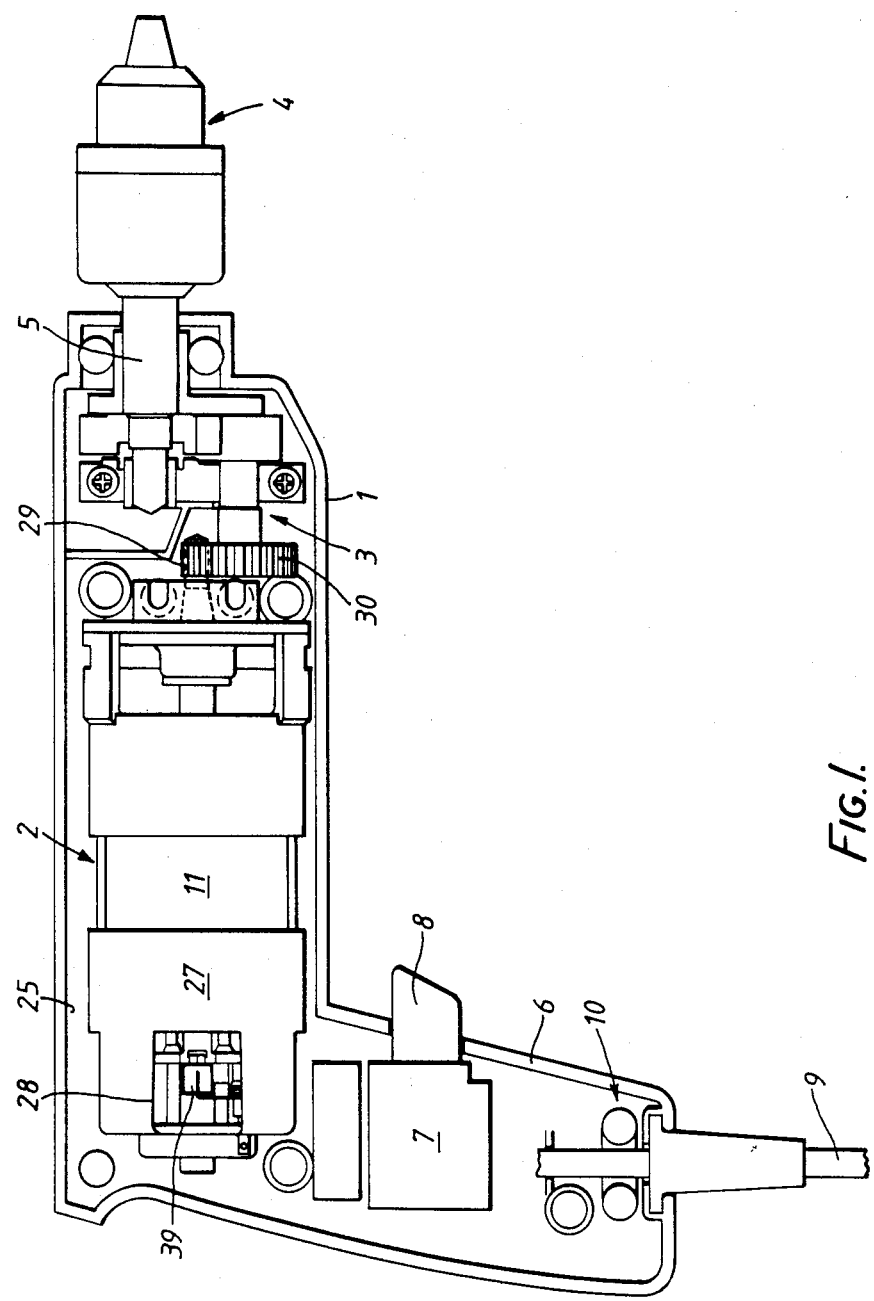
FIG. 1 is a side view of the tool with a housing half removed.
Figure 4:
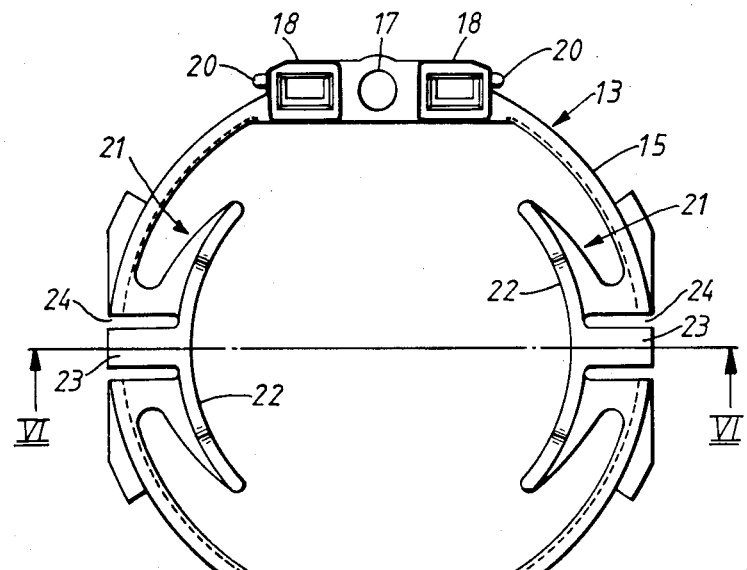
FIG. 4 is a plan view of a component of the motor assembly.
Figure 5:
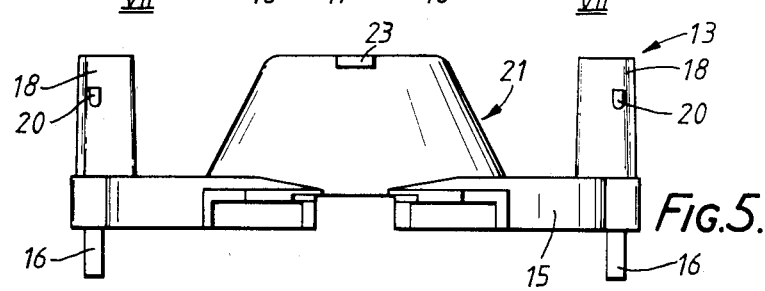
FIG. 5 is a side view of the component of FIG. 4.
Figure 6:
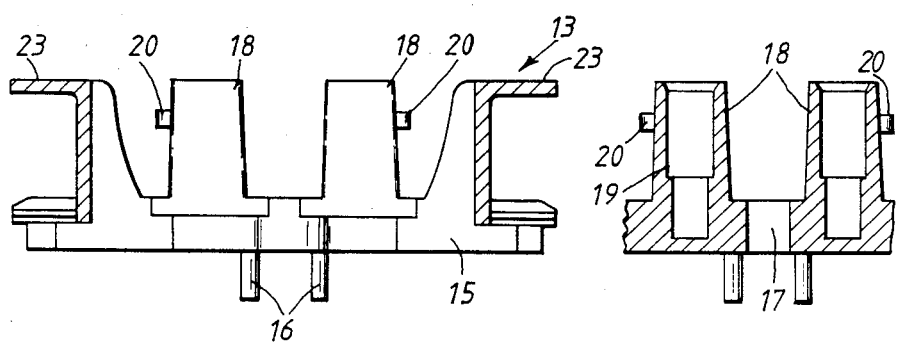
FIG. 6 is a section on the line VI—VI of FIG. 4.
Figure 7:
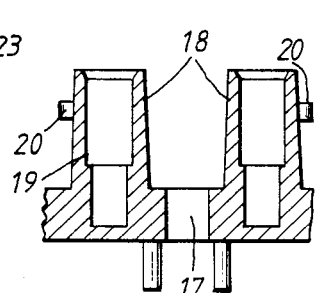
FIG. 7 is a section on the line VII—VII of FIG. 4.
Figure 8:
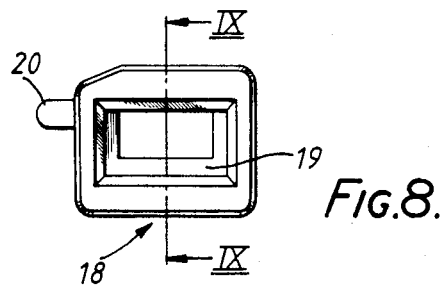
FIG. 8 is a plan view, on a different scale of part of the component of FIG. 4.

The appliance shown in FIG. 1 is a hand-held power drill. The drill has a casing of two-part clam-shell form, the clam-shells being made of a suitable plastics material. The drawing shows one half only of the casing, the other half being removed to reveal some of the working parts of the drill. In the half 1 is shown a motor unit 7 whose output shaft drives, via reduction gearing 3, a chuck 4 mounted upon the output shaft 5 of the gearing 3.

The casing is of "pistol" form with a handle 6 which is shown as accommodating a switch mechanism indicated at 7 and operable by a trigger 8 for controlling the application of power to the motor unit 2. The switch mechanism 7 is connected to a source of electric power via a drop-lead 9 held in a conventional table clamp or labyrinth indicated at 10. As will be made clearer below, the switch mechanism may, alternatively, be housed elsewhere.

The inside faces of the clam-shell halves are formed with location surfaces to locate the motor unit 2 and the gearing 3 and hold them securely in position but those surfaces are not shown in FIG. 1.

The motor unit 2, shown by itself in FIG. 2 on a larger scale and in exploded form in FIG. 3 on a smaller scale, comprises a stator or field stack 11 of the conventional laminated form. The field stack 11 carries field windings, the projecting parts of which are shown at 12 in FIG. 3. The projecting parts of the field coils are supported by end fittings 13, 14 of an electrically insulating material, for example a plastic material secured to the end faces of the field stack 11.

End fitting 13 is shown in more detail in FIGS. 4-10. It comprises a base 15 of generally annular form from one face of which extend four pins 16 integral with the base 15 and arranged in two pairs in diametrically-opposed positions.

Figure 9:
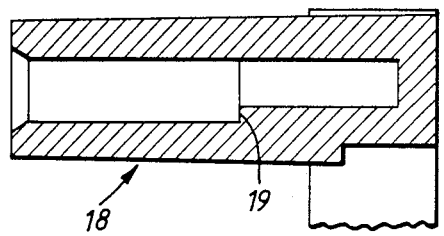
FIG. 9 is a section on the line IX—IX of FIG. 8.
Figure 10:
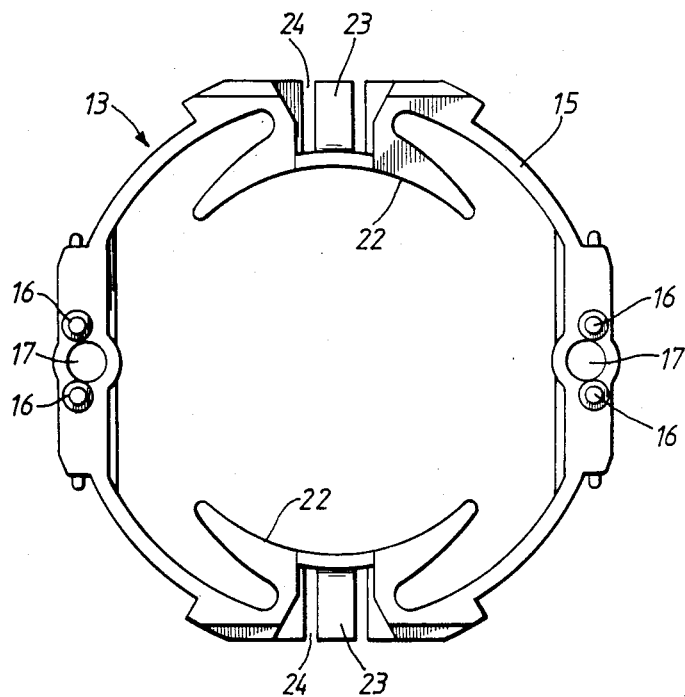
FIG. 10 is an underneath view of the component of FIG. 4.

Between the pins of each pair are holes 17 by which the ring is secured to the end of the field stack. From the other face of the ring in positions corresponding approximately with those of the pins 16 are larger projections formed as sockets 18. The sockets are stepped internally as at 19 as can be seen in FIG. 9. Each socket also has an integral projecting tab 20. When seen in plan as in FIGS. 4 and 8, the sockets are of rectangular shape.

Located between the sockets 18 are supports 21 that extend inwardly from the base 15 and have arcuately curved portions 22 spaced over their extremities from the base and that conform to the shape of the internal pole pieces on the field stack. Seen in side view as in FIG. 5, each support is of truncated triangular form and carries, at its upper end, a finger 23 that extends outwardly from the support and is aligned with a partial gap 24 in the base 15.

The socket 18 house metallic terminals that engage the terminal connectors referred to below and to which the ends of the field coils are joined.

The pins 16 are located in holes in the end face of the stack whilst the supports 21 retain the projecting ends 12 of the field windings in the conventional manner.

The other end fitting 14 is identical with fitting 13 but does not have the sockets 18.

Mounted for rotation in the field stack 11 is a rotor comprising an armature 25 (FIG. 3) supported on an armature shaft 26 having a commutator 27 at one end and a motor cooling fan 28 at the other. The cooling fan end of the shaft 26 is formed as a driving pinion 79 which meshes with input pinion 30 (FIG. 1) of the reduction gearing 3.

The ends of the armature shaft 26 are supported in bearings in housing mounted upon the ends of the field stack 11. The commutator end of the shaft 26 is mounted in a plain bearing 30 forming part of a heat sink 31. The heat sink 31 is located in an aperture 32 in the end wall of a commutator end housing 33 and held in that aperture by a mounting ring 34 of a resilient material, for example rubber. Details of the end housing 33 and the heat sink 31 and its method of mounting will be given below.

The commutator end housing 33 is a body of electrically insulating material and of generally tubular form with an annular portion 35 sized internally to fit over the end fitting 13 and the adjacent end of the field stack as can be seen in FIG. 2. Parts of the side wall of the housing 33 are cut away as at 36 to allow passage of cooling air. Two of the parts 36 in diametrically opposed positions have cut-away extensions 37 whose purpose will be described below. The housing 33 has an internal shoulder 38 against which seats a brush ring 39 when the motor unit is assembled.

The fan end of shaft 26 is supported in a plain bearing 40 supported in an end wall 41 of a fan end housing 42. The housing 42 has an annular portion 43 which seats on the other end of the field stack 11 over end fitting 14. Portion 43 has two axially extending limbs 44 of arcuate form seen in end view, to the end faces of which the end wall 41 is secured by means of sector-shaped bosses 45 which locate in slots 46 in the limbs 44 and screws 47 that pass through screw holes in the end wall and screw into the bosses 45. A fibre washer 48 is located between the fan 26 and the end face of the plain bearing 40.

The brush ring 39, further details of which are given below, supports carbon commutator brushes 49 and has four terminal connector 50 extending at right angles from one of its faces. Connectors 50 connect electrically with the metallic terminals in the sockets 18 during assembly of the motor unit 2 as will be described below.

The brush ring 39 also has input connectors 51 extending at right angles from its other face. Connectors 51 project through holes in the end wall of the housing 33 and enable electrical connection to be made to switch mechanism 7. The brush ring 39 also carries other components as will be made clear below.

Figure 11:
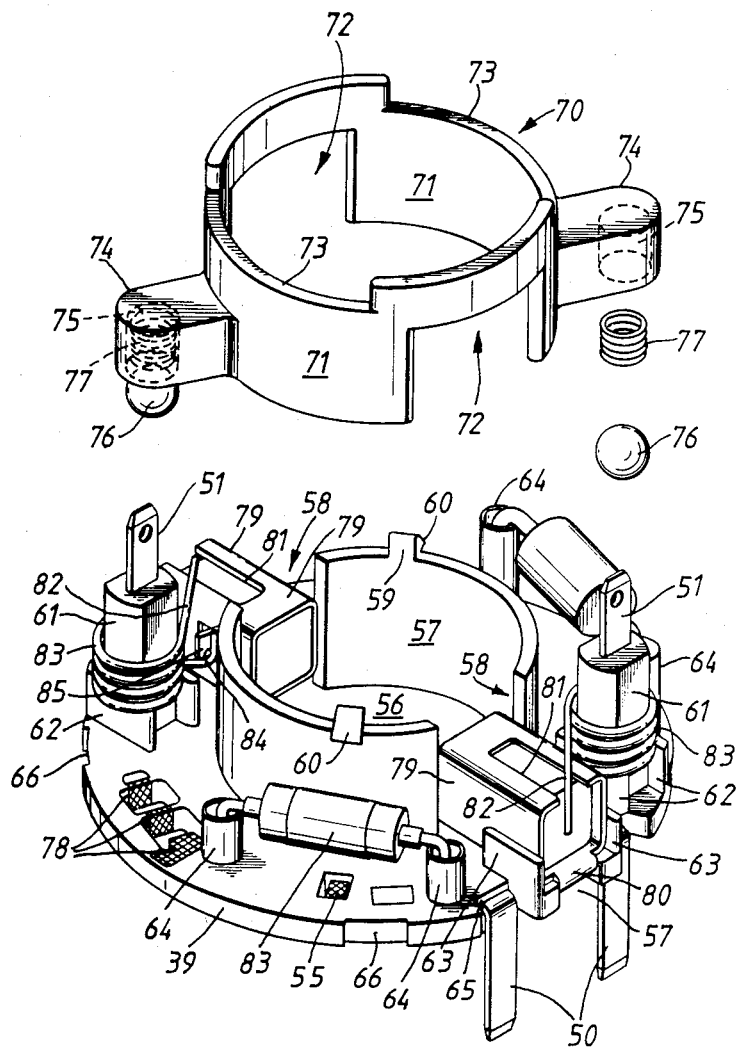
FIG. 11 is a perspective view from above and partly in exploded form of a brush ring and other components.
Figure 12:
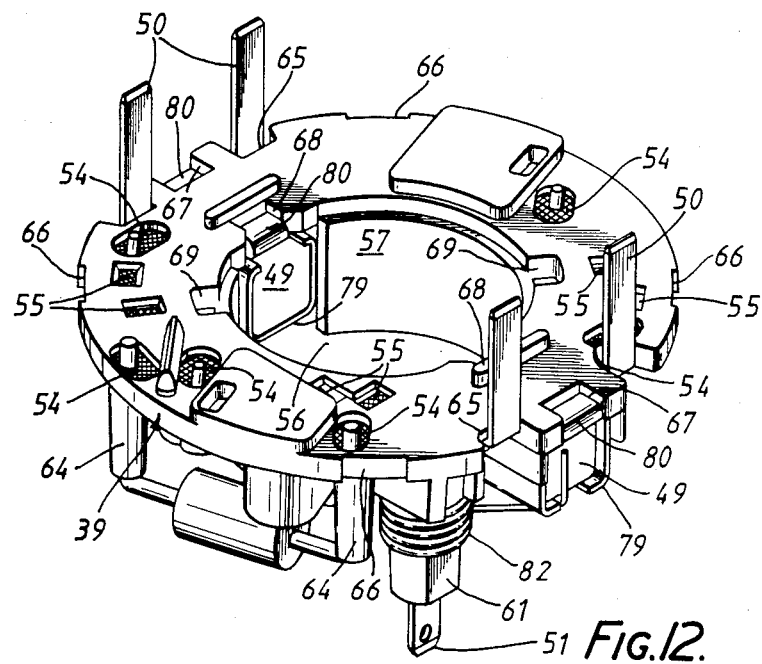
FIG. 12 is a perspective view from below of the brush ring shown in FIG. 11.

The brush ring 39 is a composite structure of generally annular form as can be seen from FIGS. 11 and 12. The ring 39 is of an electrically-insulating material for example a plastics material incorporating an array of conductors that is encapsulated into the material during the moulding thereof.

Figure 13:
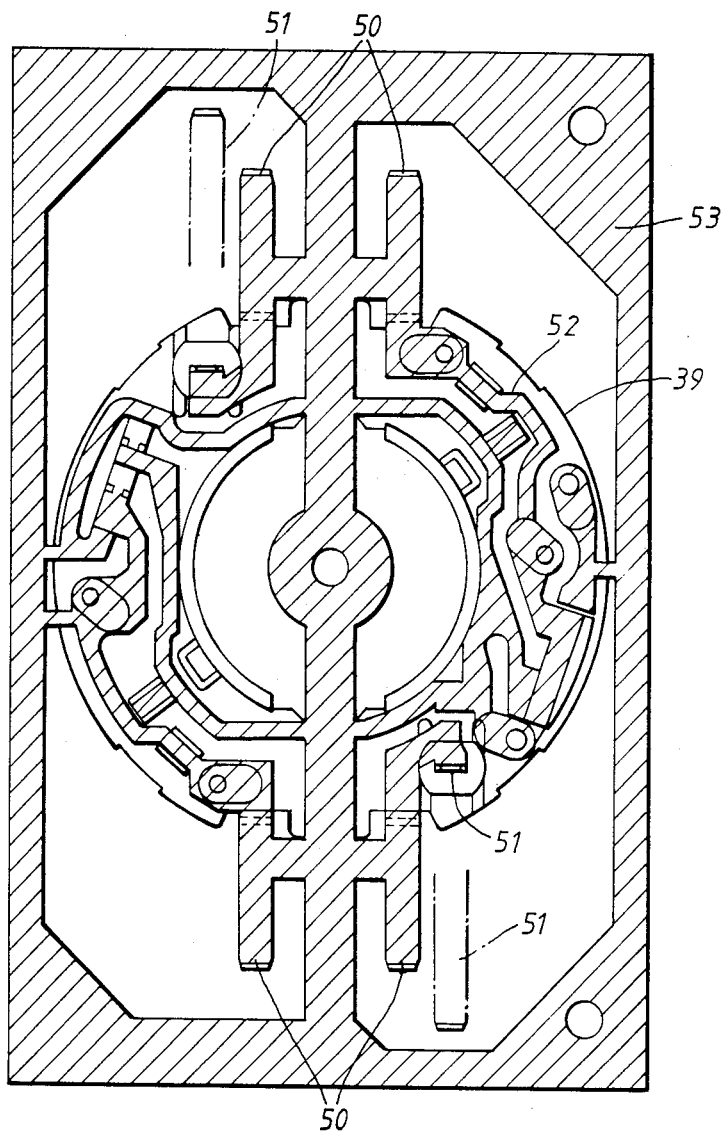
FIG. 13 is an explanatory diagram of an electrically conductive array.

The array 52 shown hatched in FIG. 13 is formed from brass sheet, by stamping for example, and includes an external 'frame' 53 which serves to support the array during the moulding of the plastic material. The array comprises the input connectors 51 that extend at right angles to the plane of the array but which are also shown, for convenience, in FIG. 13 as lying in that plane.

Plastics material is moulded round the array to encapsulate the greater part thereof. The terminal connectors 50 emerge from the edge of the ring 39 as shown in FIGS. 11 and 12. After the brush ring 39 has been moulded, the frame 53 is removed by trimming off thereby leaving a basic circuit configuration that will be described below. Selected areas of the array are left exposed through the lower surfaces of the ring 39, such areas being indicated at 54. Further selected areas 55 of the array are also left exposed on both surfaces of the ring 39. Exposure of those surfaces is effected by the use of appropriately positioned cores during the moulding of the ring 39.

Moulded integrally with the ring 39 round the central, circular aperture 56 therein is an upstanding wall 57 gapped at diametrically opposed positions 58. The upper edge of the wall 57 has two fingers 59 with bevelled upper edges 60. The fingers 59 are also located at diametrically opposed positions.

As can be seen from FIGS. 11 and 12, moulding material extends part-way up the input connectors 51 as indicated at 61 to form an electrically protective sheath round the connectors. That part of the sheat adjacent the surface of the brush ring is shaped to form spaced seating surfaces 62.

Also moulded integrally with the ring 39 are spaced walls 63 that are aligned in a radial direction with the edges of the gaps 58 in the wall 57, and protective tubular extensions 64.

The walls 63 extend, at their outer edges, to the periphery of the ring 39 and border recessed portions 65 of the edge of the brush ring that allow the connectors 50 to be turned from the plane of the array within the periphery of the ring. That edge also has other recesses 66 whose function is described below.

The edge of the ring 39 is also cored out as at 67 on its upper surface (as seen in FIG. 12) to expose other areas of the array.

The inner edge of the brush ring 39 is formed during moulding at areas 68 to expose other portions of the array and at other areas 69 intermediate areas 68.

The wall 57 forms a bearing surface for a switch body 70 that is employed in certain embodiments of the invention as will be described below and which is held in place by the fingers 60. The switch body 70 shown in FIG. 11 has a central tubular portion 71 whose curved wall is cut-away as at 72 over circumferential distances somewhat greater than that of the gaps 58. The upper (as seen in FIG. 11) edge of the curved wall is also cut away as indicated at 73.

Extending radially from the portion 71 and at diametrically opposed positions are bosses 74 each with a transverse passage 75 closed at its inner end. Each passage accommodates a metal ball 76 urged outwardly from the passage by means of a helical spring 77 housed in the passage.

The metal balls 76 constitute moving switch contacts and they co-operate with exposed parts of the array, those exposed parts consituting the fixed contacts of the switch. Some of the fixed contacts are visible in FIG. 11 at 78. There are two sets of such fixed contacts disposed in diametrically opposed positions. One set co-operates with one of the metal balls 76 and the other set co-operates with the other of the metal balls.

Figure 14:
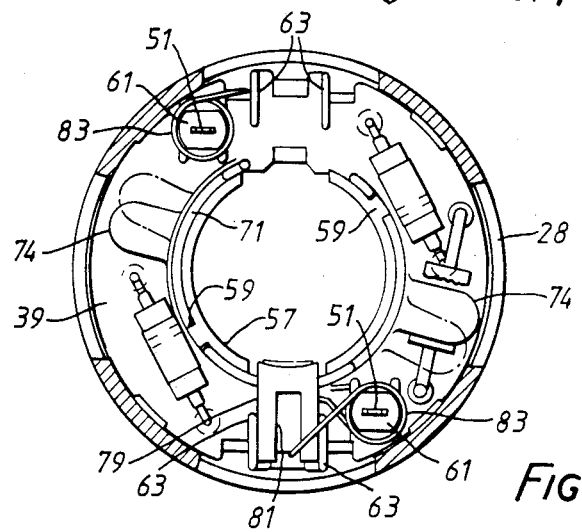
FIG. 14 is a plan view of a brush ring with some components removed.

The switch body 70 is rotatable round the wall 57 within limits imposed by the brush boxes that extend through the gaps 58 in the wall 57. However, the actual movement of the body 70 is less and is indicated in FIG. 14, the two extreme positions of the body 70 being shown.

Movement of the switch body 70 is effected by the user via a linkage connecting the body to an actuator which may be a member accessible through an aperture in the casing of the tool containing the motor, for example the drill shown in FIG. 1. Alternatively, the body 70 may be linked to the trigger 8 which, in this case, will be a multi-position trigger.

The brush ring 39 supports two brush boxes 79. The brush boxes 79 are open-ended sheet brass pressings with axial mounting tags 80 which are crimped over the internal and external edges of the brush ring so making electrical connection with the exposed portions of the array in areas 67 and 68. As can be seen from FIG. 11, the walls 63 lie between the brush boxes 79 and the connectors 50 to provide a degree of electrical insulation and also to increase the tracking distance between those components.

In addition to providing electrical connection for the brush boxes 79 to the array, the tags 80 also secure the boxes physically to the brush ring 39.

Each brush box 79 has a slot 81 in its upper (as seen in FIG. 11) surface. The slots 81 permit engagement with the outer ends of brushes 49 of end portions 82 of brush springs. The brush springs include helical portions 83 mounted upon the sheathed parts of the connectors 51 and resting upon the seating surfaces 62. The other ends 84 of the brush springs are hooked to engage and be retained by lugs 85 pressed out of the side walls of the brush boxes. The sheaths 61 insulate the brush springs electrically from the connectors 51.

The slots 81 are of a length sufficient to allow the spring end portions 82 to retain contact with the brushes and to keep the latter in engagement with the commutator despite brush wear.

FIGS. 14–17 show in more detail the way in which the brush ring 39 is accommodated within the commutator end housing 33, some components being omitted for the sake of clarity.

Figure 17:
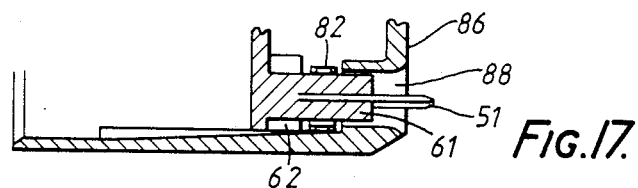
FIG. 17 is a scrap view of a part of the end fitting.
Figure 15:
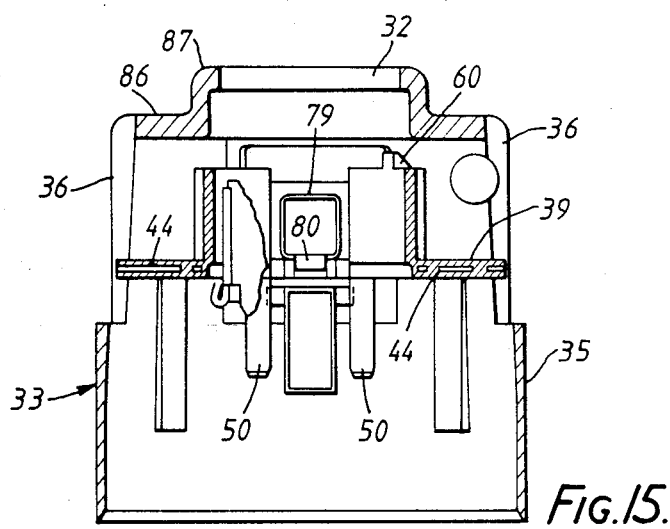
FIG. 15 is a vertical section of an end fitting and including some other components.
Figure 16:
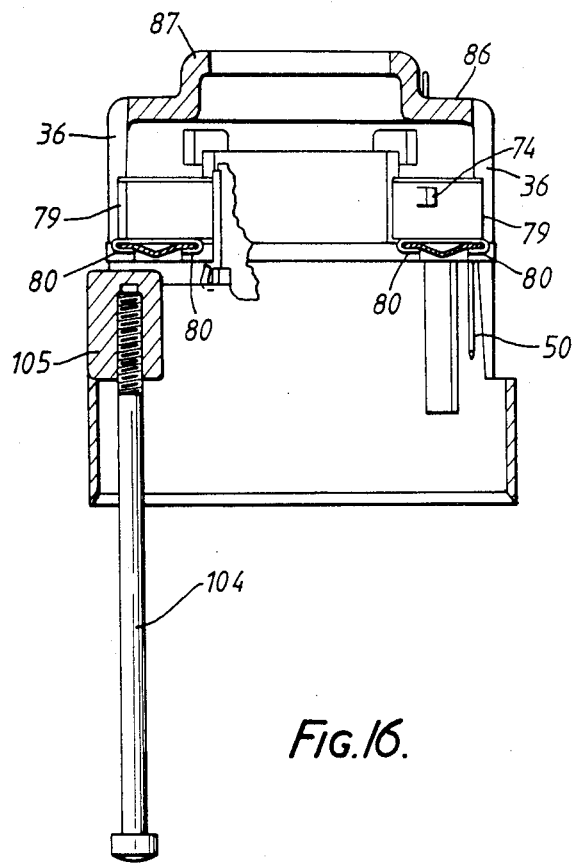
FIG. 16 is a vertical section similar to FIG. 15 but in a plane at right angles to the plane of FIG. 15, some components being omitted for simplicity.
Figure 18:
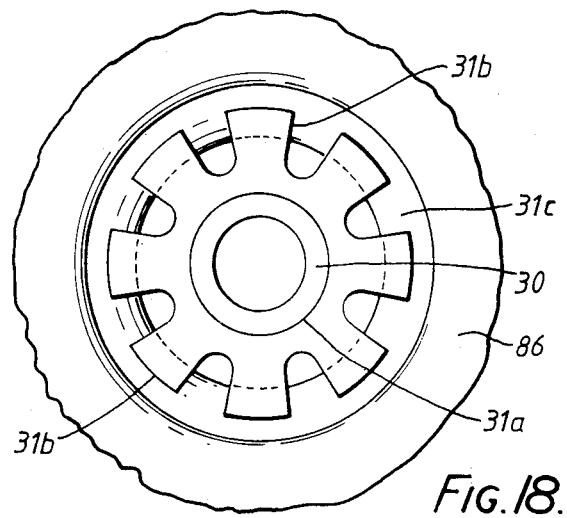
FIG. 18 is an end view of a bearing assembly.

FIGS. 15 and 16 show the contour of the end wall 86 of the commutator end housing and the aperture 32 in which the heat sink 31 and bearing 30 are located. The aperture 32 is formed in an upstanding central boss 87 of the end wall 86, the inner side of the boss accommodating a part of the heat sink. FIG. 17 shows one of the holes through which extend the input connectors 51, the hole being indicated by reference numeral 88. The sheath 61 on the connector assists in the location of the connector centrally in the hole 88.

FIGS. 15 and 16 also show the encapsulation of the array in the plastics material of which the brush ring is formed, and the manner in which the tongues 80 of the brush boxes 79 make electrical contact with the array after having been crimped over the respective exposed parts thereof.

Figure 19:
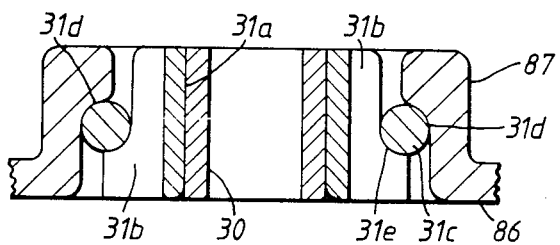
FIG. 19 is a vertical cross section of the bearing assembly mounted in a wall.

FIG. 19 which is a scrap section through part of the end wall 86 shows form of and the manner in which the heat sink 31 is secured in the aperture 32.

The heat sink 31 is a light alloy casting of generally tubular form with an axial bore 31a and spaced, radially extending fins 31b along its external surface. As can be seen from FIG. 19, the height of the fins 31b is greater at one end of the heat sink, the, junction between the parts of greater and smaller height being rounded as at 31e to form part of a location for an 'O' ring 31c.

The internal contour of that part of the boss 87 surrounding aperture 32 provides a rounded seat 31d which forms the other part of a location for the 'O' ring 31c.

Located in the bore 31a is the plain bearing 30 which is an interference fit in the bore.

The spaced fins allow the circulation of air between them, such circulation being assisted, when the motor is in use by the action of the fan 28.

The array 53 provides a network of conductors that may be modified to provide different electrical circuits each suitable for a particular set of controls with which the motor unit is to be provided.

Figure 20:
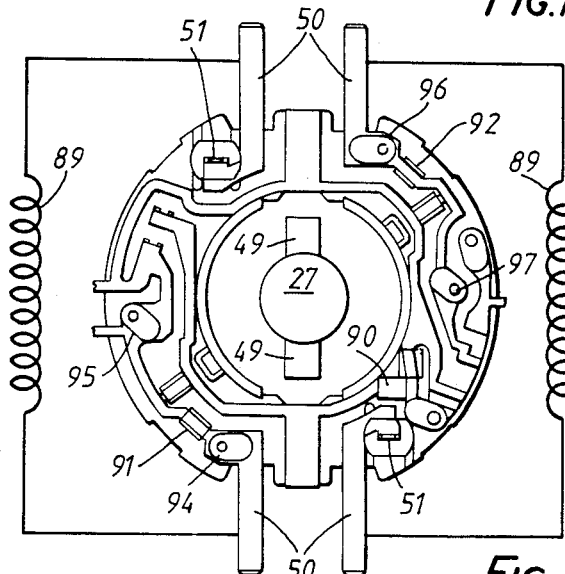
FIGS. 20, 21 and 22 are diagrammatic representations of various circuit configurations.

FIG. 20 shows the basic circuit configuration of the conductor network, the field coils 89 being indicated diagrammatically as joined to the connectors 50. By removing part 90 of the array, a simple series connected motor circuit is provided from the upper input terminal 51 then via the left-hand connector 50 to the left-hand field coil 89 and then via the lower brush 49, commutator 27 to the upper brush 49 and thence through the right-hand field coil 89 to the lower input terminal 51. Part 90 of the network is accessible for removal because it is one of the exposed parts 55 referred to above.

In the simple case just described, the switch body 70 is not present and the switch contacts 78 are not part of the operative circuit.

If the motor circuit just described is to include two RF chokes, parts 91 and 92 of the network are removed, such parts being left exposed during the moulding of the brush ring and are designated 55 above. Part 90 is also removed as before. Chokes 93 are connected in circuit by soldering them between the appropriate exposed parts 55 of the array. In FIG. 20, those parts are referenced 94, 95 for one choke and 96, 97 for the other choke. The choke leads are protected, at least partially, by the tubular extensions 64 of the brush ring 39 through which those leads pass. One of the chokes 93 is shown in FIG. 11 in its final position.

A circuit including the chokes is completed from upper input 51 through left-hand field coil 89 to choke terminal 94, choke 93, choke terminal 95 to lower brush 49, commutator 27, upper brush 49, choke terminal 97, choke 93, other choke terminal 96, right-hand field coil 89 and back to the lower input terminal 51. Again, in this case, the switch body 70 is not present and the switch contacts 78 are not part of the operative circuit.

Figure 21:
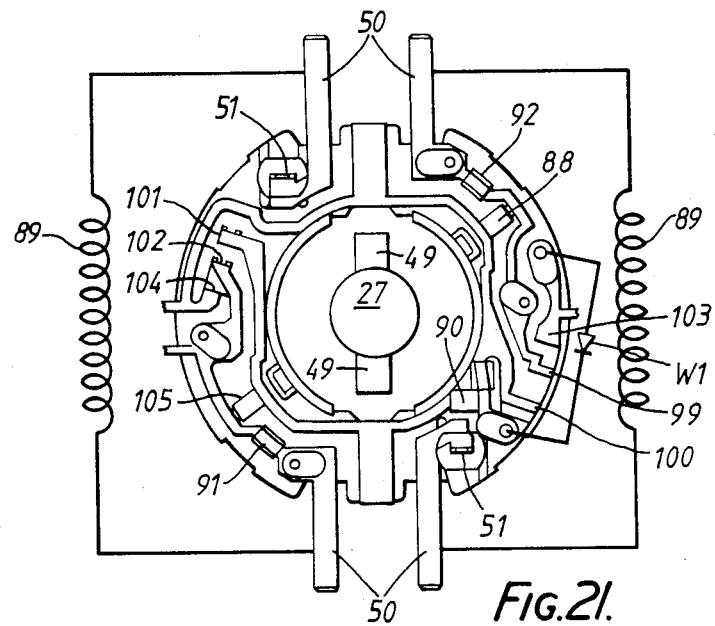

FIG. 21 is a view of the conductor array with speed control providing full speed and reduced speed. Speed reduction is provided by including a half-wave rectifier W1 in the circuit and using the switch body 76 to switch the rectifier W1 in and out of circuit in accordance with the motor speed required.

As before, part 90 of the array is removed as are additional parts 88 and 105. This provides a circuit from upper input 51, through left-hand field coil 89 to fixed contact 102 of the switch, moving ball contact 76, to second fixed contact 101, lower brush 49, commutatoor 27, upper brush 49, fixed contact 100, moving ball contact 76, to second fixed contact 99, right-hand field winding 89 and lower input 51.

The circuit just traced gives full speed. Reduced speed is obtained by rotating switch body 70 to switch in the rectifier W1 thereby completing a circuit from upper input 51, left-hand field coil 89, fixed contact 102, movable ball contact 76 to fixed contact 101, lower brush 49, commutator 27, upper brush 49, fixed contact 100, rectifier W1, movable ball contact 76, fixed contact 103, fixed contact 99, right-hand field coil 89 and lower input 51.

Chokes can be fitted to the dual speed circuit just described by removing parts 91 and 92 as before and fitting the chokes in the positions described above.

Figure 22:
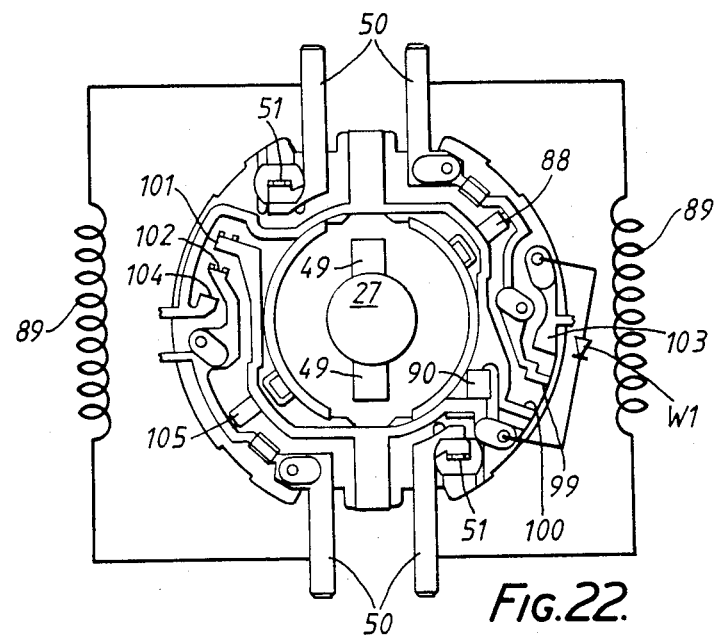

Reversal of the direction of rotation of the motor can also be obtained. The rectifier W1 is maintained to limit the motor speed in the reverse direction. The conductor array is shown in FIG. 22.

As before, parts 88, 90 of the array are removed together with part 105.

The forward direction of the motor is achieved via a circuit from upper input 51, left-hand field coil 89, fixed contact 102, movable ball contact 76, fixed contact 101, lower brush 49, commutator 27, upper brush 49, fixed contact 100, fixed contact 99, right hand field coil 89 to lower input 51.

To reverse the direction of rotation, switch body 70 is rotated to a position providing a reverse direction circuit as follows: upper input 51, left-hand field coil 89, fixed contact 102, movable ball contact 76, fixed contact 104, upper brush 49, commutator 27, lower brush 49, rectifier W1, contact 103, movable ball contact 76, fixed contact 99, right-hand field coil 89 to lower input 51.

Again, if required, chokes can be added, in the manner described above, to the speed reversal circuit just described.

Whilst the motor unit 2 can be assembled manually, it is preferred to assemble the components on an automated assembly line. However, in both cases, the assembly process is basically the same.

The field stack 11 is made and assembled in a conventional manner as is the armature 25.

A brush ring 39, complete except for brushes, is then offered up to the end ring 13 and connectors 50 firmly engaged in sockets 18.

The commutator end bearing is put together by pressing the bearing 30 into the heat sink 31.

The fan end bearing is put together in a generally similar fashion by pressing bearing 40 into the aperture in the end wall 41.

The resilient ring 34 is mounted in a recess (described below) in the end wall of housing 35 after which the heat sink assembly comprising heat sink 31 and bearing 30 is pressed into the aperture in the end wall.

Housing 35 is then located over the brush ring 39, the end fitting 13 and the adjacent end of the field stack 11. The periphery of the brush ring seats on the internal shoulder 38 referred to above. Housing 42 is next located over the end fitting 14 and the adjacent end of the field stack.

Long field screws 104 are passed through axial holes in housing 43 and in the field stack and screwed into blocks 105 to hold the end housings 33 and 43 on to the field stack, the brush ring 39 being sandwiched between end fitting 13 and the internal shoulder 38. The blocks 105 are located in the extensions 37 of the cut-aways 36 in end housing 33.

The next stage is to fit washers 48 and 106 and a spring washer 107 to the respective ends of the shaft 26 as shown in FIG. 3 and enter the armature 25 through the open end of housing 43 until the commutator end of the shaft engages in bearing 30.

At this stage, a measurement is taken of the distance from the outer end face of one of the limbs 44 to the fan end housing location as identified by the adjacent end face of the stack 11. If the motor unit is being assembled manually, further washers are added to the fan end of the shaft 26 to bring the measured distance up to a specified value.

In the case of automated assembly, the location of the bearing sleeve 40 in the end plate 41 is adjusted to provide a distance of the specified value and is then locked in position.

In those ways, the degree of axial movement of the armature is confined to within an acceptable known value.

End wall 41 is now secured to the limbs 44 of housing 43 using the two screw bosses 45 which locate in the recesses 46 in the limbs 44, the wall then being secured in place by screws 47 which screw into the bosses 45.

Brushes 49 are now located in brush boxes 79 on the brush ring 39 and held in place by the brush springs.

At this stage, the motor unit 2 can be tested both electrically and mechanically and if found to be satisfactory is then ready for inclusion in an appliance, for example, the hand drill of FIG. 1.

FIGS. 23–30 show another form of brush ring.

Figure 23:
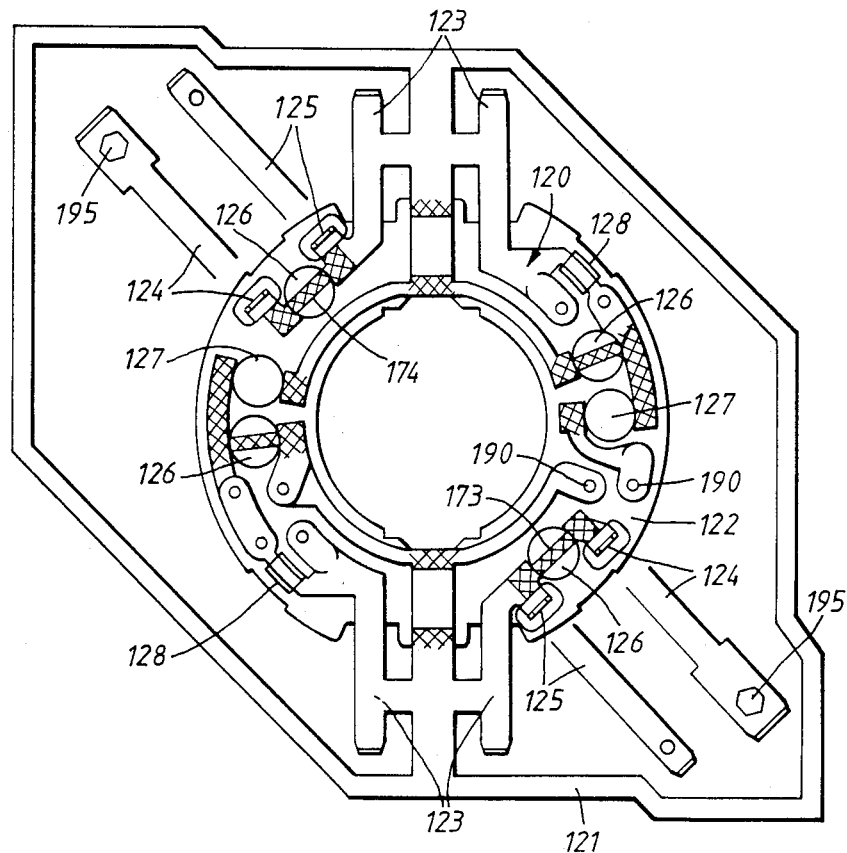
FIG. 23 is an explanatory diagram of another form of brush ring and electrically-conductive array.
Figure 24:
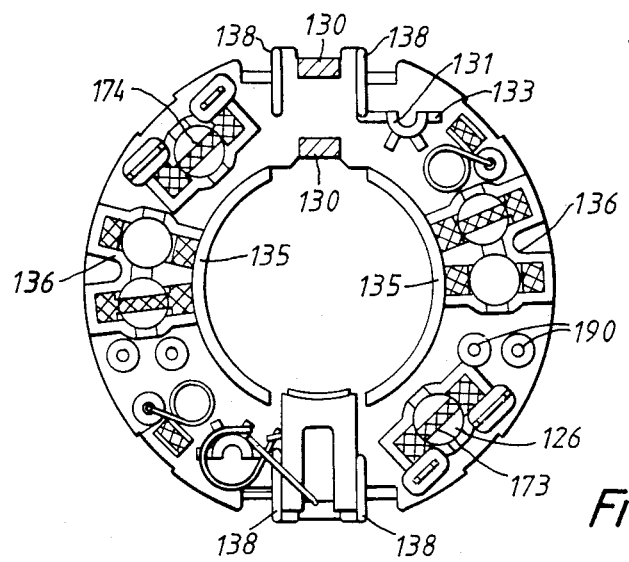
FIG. 24 is a plan view of the other form of brush ring with certain components mounted thereon.
Figure 25:
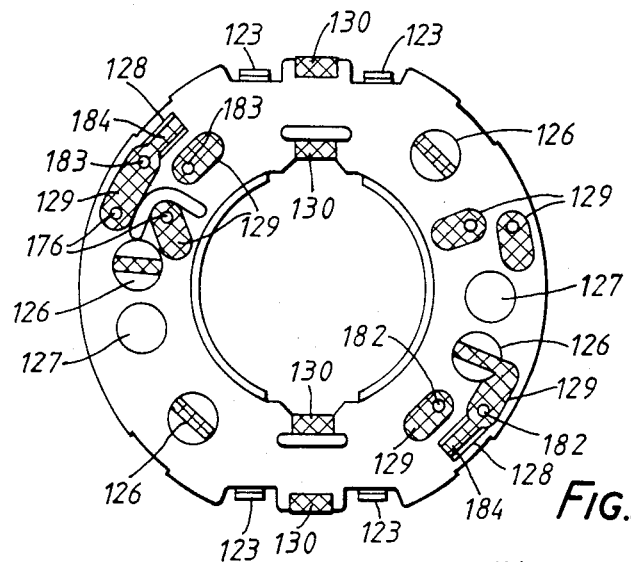
FIG. 25 is an underneath view of the brush ring of FIG. 24.

FIG. 23 shows an array 120 with its external supporting frame 121 that serves to support the array during the moulding of the brush ring 122 which is of a plastics material as before and is shown in FIG. 23 with the array 120 superimposed on it. The array 120 is generally similar to that described above having a terminal connectors 123 that connect to field windings via terminal connectors in the commutator end ring as before. It will be understood that the frame connection shown in FIG. 23 to the terminal connectors 123 will be trimmed off after the ring has been moulded.

The position of the power input terminals 124 is different from those of input terminals 51 described above. The positions of terminals 124 are spaced further from the terminal connectors 123 than is the case in the construction described above, the extra spacing accommodating further connectors 125 whose function will be described below.

To enable the physical form of the input connectors 124 and the further connectors 125 to be seen clearly, these connectors are shown additionally in the plane of the array 120.

During moulding, the ring 122 is formed with "windows" that expose certain parts of the array. The windows which expose the parts shown cross hatched within the window through both the upper and lower faces of the ring are indicated at 126 in FIG. 23. Additional windows 127 are formed on the ring but these do not expose parts of the array and their function will be described below. In addition, further parts of the array indicated at 128 are left exposed on both faces of the ring 122. The upper surface of the ring 122 is also formed to expose those parts of the array shown cross hatched in FIG. 23. The undersurface of the ring is also formed to expose other parts of the array also shown cross hatched as indicated at 129 in FIG. 25. Those parts include areas 130 at the inner and outer peripheries of the ring 122 for the connection of brush boxes in a manner similar to that described above.

During the moulding of the ring 122, integral supports 131 (FIG. 26) are provided for the brush spring 132, those supports having bases 133 on which the springs 132 rest. Sheating 134 is also formed during moulding round the greater part of the terminals 124, 125 and the brush springs 132 could be mounted upon that sheating if desired, instead of on the supports 131 which could then be dispensed with. Also formed integrally with ring 122 during the moulding thereof is the gapped wall 135, a series of partitions 136 that form pockets extending around the windows 126 and 127, long tubular columns 137 and walls 138 between the field connectors 123 and brush boxes 139, and short tubular extensions 140.

The brush boxes 139 are secured physically to the brush ring 122 and electrically to the exposed portions by crimping over the exposed parts 130 of the array tongues 139a that are integral with the boxes. Brushes, one of which is shown at 141, are urged into contact with the armature commutator by end 142 of the brush springs, the boxes 139 being slotted as at 143 to allow movement of the ends 142 along part of the length of the box as the brushes wear.

Figure 27:
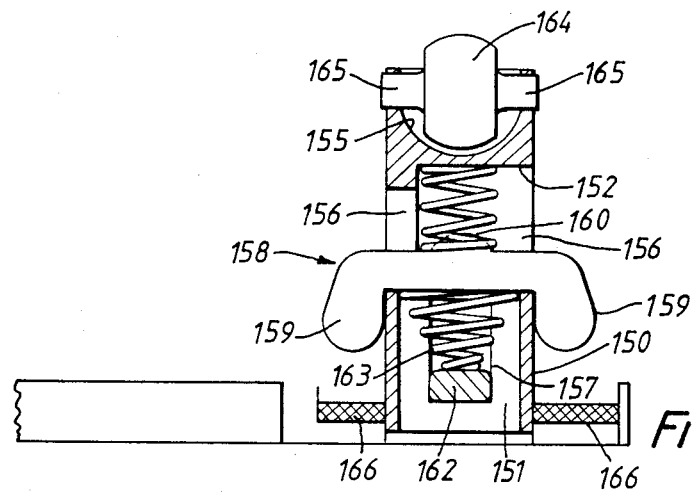
FIG. 27 is a vertical section of a switch assembly.
Figure 28:
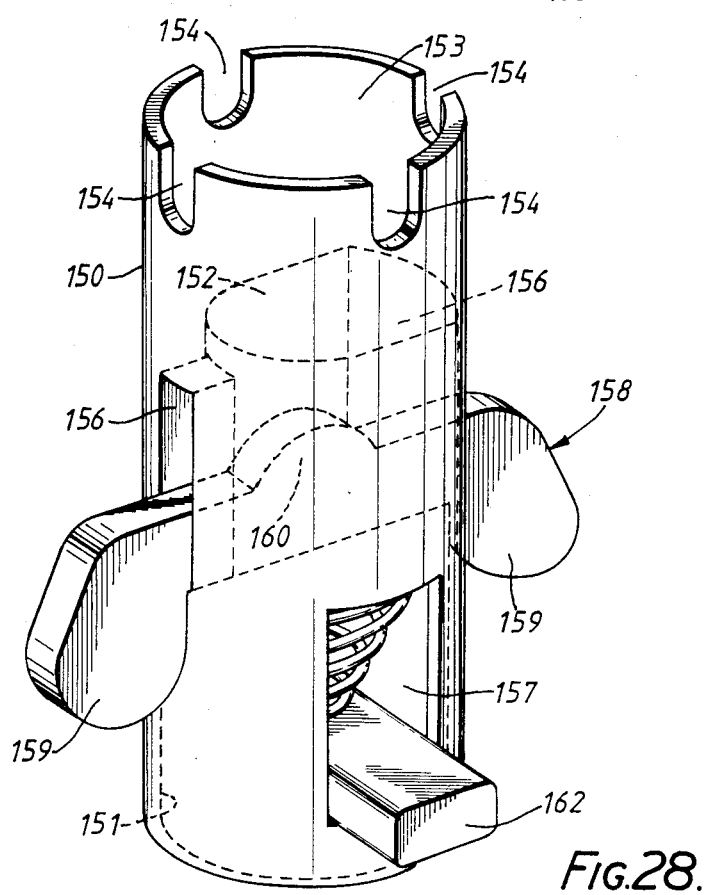
FIG. 28 is a perspective view of the switch assembly with a component removed.

The pockets 144-149 formed by the partitions 136 each accommodate switch contact assemblies shown in section in FIG. 27 and in perspective in FIG. 28.

Each switch contact assembly comprises a cylindrical body 150 of a plastics material with an internal bore 151 that terminates at an internal transverse wall 152. The upper end of the body 150 has a peripheral wall 153 gapped at 90° intervals as indicated at 154. The upper face of the wall 152 is semi-spherical as indicated at 155 in FIG. 27, the curved contour extending up the inside of the wall 153.

The side walls of the body 150 are slotted as at 156, 157 in diametrically opposed positions, the lower slots 157 lying on a diameter that is at right angles to that on which the upper slots 156 lie. As can be seen clearly in FIG. 27, the top and bottom length of the right-hand (as seen in FIG. 27) slot 156 is somewhat greater than that of the left-hand slot.

Located in the upper slots 156 and guided for up and down movement thereby is a contact bar 158 whose ends project from the body 150 and have downwardly extending rounded contacts 159. The contact bar is of copper or some other material of low electrical resistivity. The upper face of the bar 158 has a central protuberance 160 that forms a lower seating for a helical spring 161 that locates between the seat 160 and the transverse wall 152, thus biassing the bar 158 into the position shown in FIGS. 27 and 28 in which the bar is in contact with the lower edges of the slots 156. The spring 161 is entered through the larger right-hand slot of the slots 156 after the bar 158 has been positioned in the slots.

Located in the lower slots 157 is pin 162 of a plastics material that also projects at both ends from the body 150. A second helical spring 163 of frustoconical form is located between the bar 158 and the pin 162 biassing the latter into the position shown in FIGS. 27 and 28 in which the pin is in contact with the lower edges of the slots 157.

The space bounded by the wall 153 accommodates part of a roller 164 supported upon stub axles 165 that locate in diametrically opposed slots 154.

Figure 26:
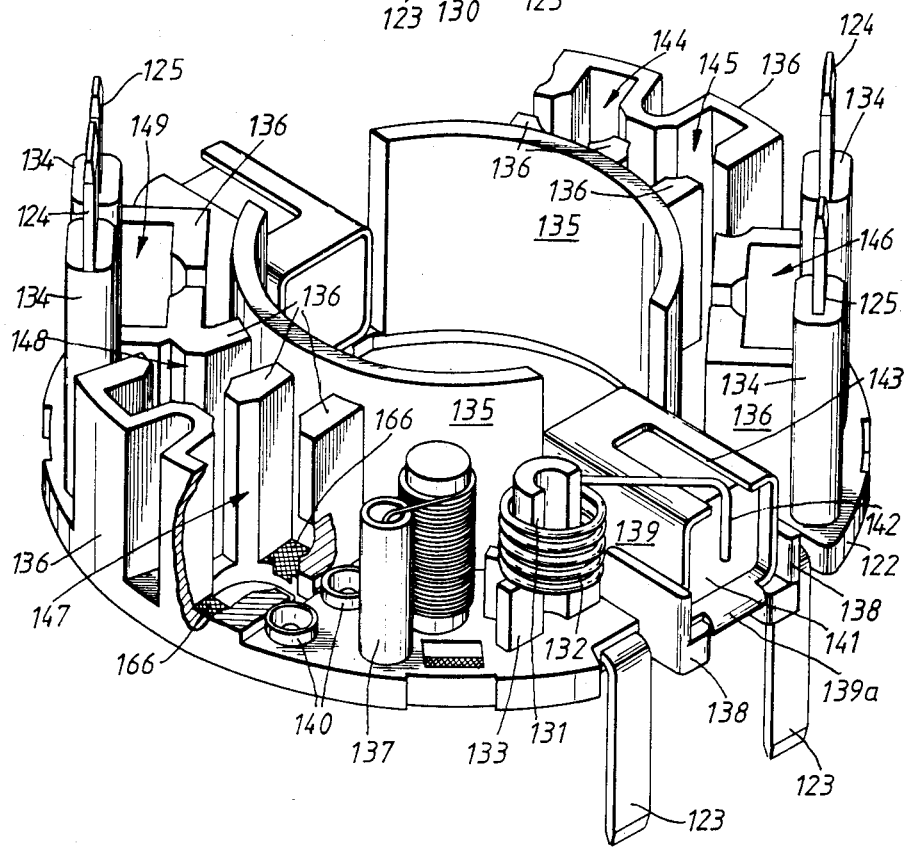
FIG. 26 is a perspective view from above of the brush ring of FIG. 24.

The switch assemblies are positioned in the pockets by the lower ends of the bodies 150 that locate in the windows 126, 127 in the brush ring, the pins 162 resting upon the upper race thereof. In the case of windows 126, the exposed parts of the array that bridge the windows are punched out leaving an unobstructed window with exposed portions of the array in diametrical opposed positions with respect to the window. Examples of the remaining exposed portions are referenced 166 (FIG. 26 and 27).

Figure 29:
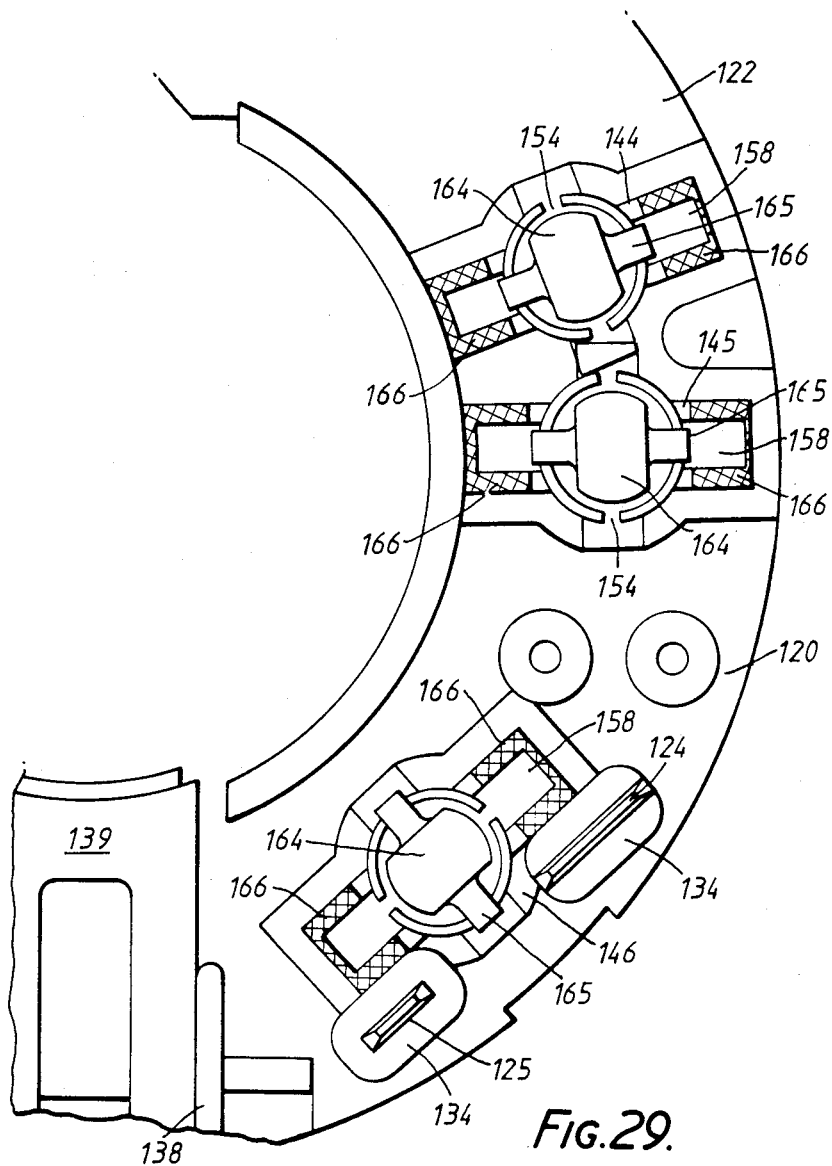
FIG. 29 is a plan view on an enlarged scale of part of the brush ring of FIG. 24.
Figure 30:
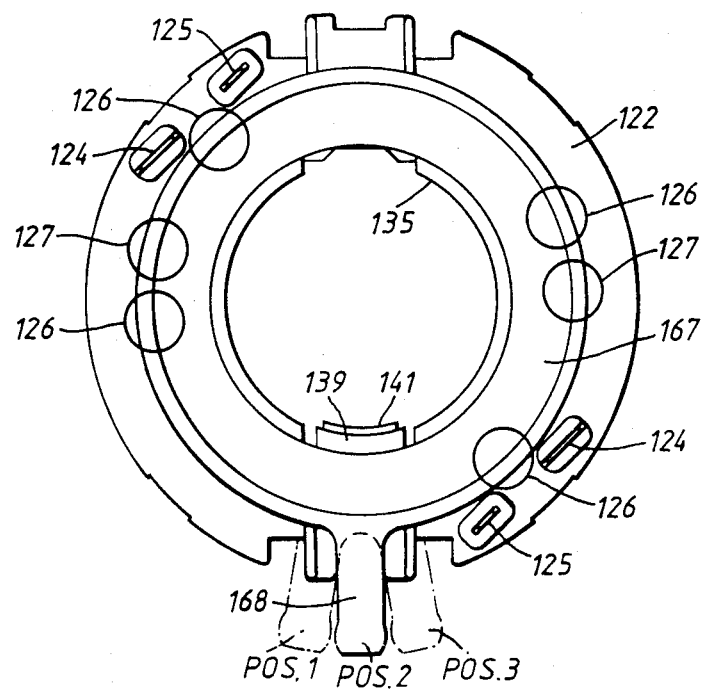
FIG. 30 is a plan view of the brush ring of FIG. 24 showing certain components only.

FIG. 29 shows three of the pockets 144, 145 and 146 with spring assemblies located therein and it will be observed that in the case of the spring assemblies in pockets 144 and 145, the axles 165 of the rollers 164 are in the vertical same plane as that of the contact bar 158 but in other spring assembly in pocket 146, the axles 165 lie in a vertical plane that is at right angles to that containing the associated contact bar 158. The provision of four slots 154 in the body 150 of the switch assembly enables the appropriate choice of two to be made in dependence upon the required orientation of the roller.

The contact bars 158 of the various switch assemblies in the pockets 144, 145, 147 and 148 co-operate with exposed parts 166 of the array to carry out various switching operations connected with the operation of the motor. The assemblies in pockets 146 and 149 provide power supply switching as will be described below. A choice can be made during manufacture of the switching facilities that are to be provided and the array 122 will be modified accordingly and the necessary switch assemblies provided.

When fitted, the assemblies are actuated by a cam plate 167 (FIG. 30) of annular form that is rotatably mounted over the wall 135 and rests upon the upper ends of the partitions 136. The plate 167 has a radially extending finger 168 by which the plate can be rotated into one or other of its various control positions. The finger extends outwardly beyond the outer periphery of the brush ring 122. The finger 168 is linked to an actuating member accessible to a user. The member may be accessible through an aperture in the casing of the tool for example the drill shown in FIG. 1. Alternatively, the finger 168 may be linked to the tool trigger which, in this case will be a multi-position trigger.

Figure 31:
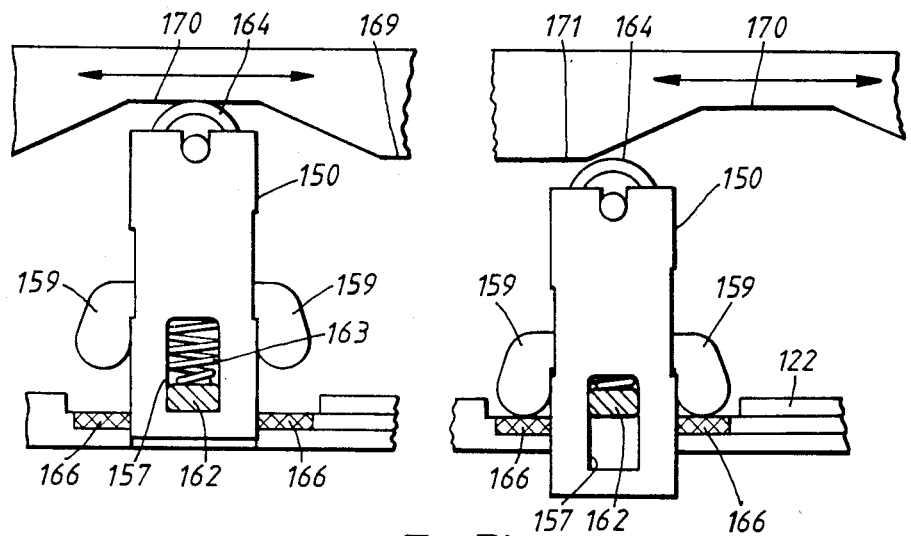
FIG. 31 is an explanatory diagram of a switch operating member and switch assemblies.

The underneath (as viewed in FIG. 30) face of the cam plate 167 is formed with a circular cam track a part of which is shown at 169 in FIG. 31 and which is configured to provide actuation of the switch assemblies as required by the switching facilities to be provided. The track 169 has recessed portions 170 and when one of them is aligned with a switching assembly, the lower spring 163 allows the assembly to rise, the left-hand assembly seen in FIG. 31 being in that raised position. The cam plate 167 also has raised portions 171 which when aligned with a switch assembly contact the roller 164 and 163 push down the assembly compressing both springs 161 and 163 and bring the rounded contacts 159 into electrical contact with the exposed parts 166 of the array. The use of the two springs 161 and 163 allows for manufacturing tolerances and avoids over stressing any components of the switch assembly.

The array 120 provides a network of conductors that may be modified to provide different electrical circuits each suitable for a particular set of controls with which the motor unit is to be provided. Depending upon the particular set, a combination of switching assemblies is fitted although in a particular set no assemblies are fitted.

By way of example, particular sets of controls will now be described with reference to FIGS. 32-41.

Figure 32:
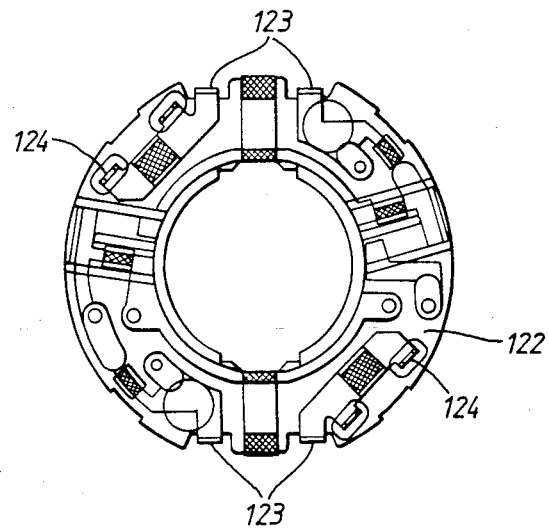
FIGS. 32 and 33 are, respectively, plan view and circuit diagram of a first circuit configuration incorporating the brush ring of FIG. 24, FIGS. 34 and 35 are, respectively, plan view and circuit diagram of a second circuit configuration incorporating the brush ring of FIG. 24, FIGS. 36 and 37 are, respectively, plan view and circuit diagram of a third circuit configuration incorporating the brush ring of FIG. 24, FIGS. 38 and 39 are, respectively, plan view and circuit diagram of a further circuit configuration incorporating the brush ring of FIG. 24, and, FIGS. 40 and 41 are, respectively, plan view and circuit diagram of a fifth circuit configuration incorporating the brush ring of FIG. 24.
Figure 33:
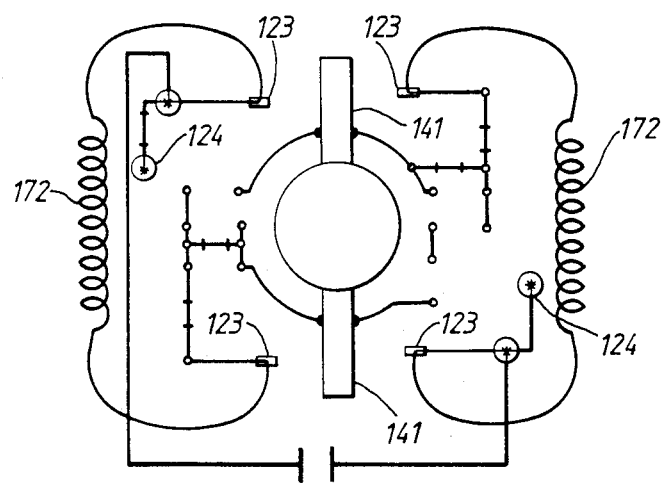

FIG. 32 shows the configuration of the array 120 for a basic motor circuit with a trigger controlled ON-OFF power switch in the handle of the tool containing the motor unit. There is no modification of the array and an electrical circuit is provided from the upper (FIG. 33) power input terminals 124 to connector 123 and thence to the left-hand field coil 172 and via connector 123 and the appropriate part of the array 120 to the lower brush 141, through the commutator to the upper brush 141. From the upper brush the appropriate parts of the array 122 connect with a connector 123 to the right-hand field winding and thence back to the lower input terminal 124. No switch assemblies are used and the motor unit has a single speed only.

Figure 34:
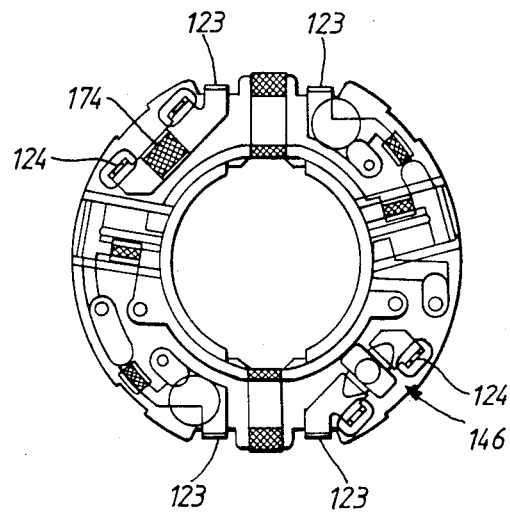

FIG. 34 shows the configuration of the array 120 for a motor unit in which a single pole power supply switch is mounted upon the brush ring 122 and replaces the trigger operated handle switch referred to in the immediately preceding example. To permit connection of the switch, that part 173 of the array 120 lying across the lower right-hand (FIGS. 23 and 34) window 126 is removed and a switch assembly is located in the associated pocket 146. The contact bar 158 of the switch assembly is shown schematically in FIG. 35 and it controls the connection of the lower input connector 124 to the adjacent terminal 123. A cam plate 167 is seated over the wall 135 and secured in place against the upper surfaces of the partitions 136 by the end moulding within which the brush ring is located.

Figure 35:
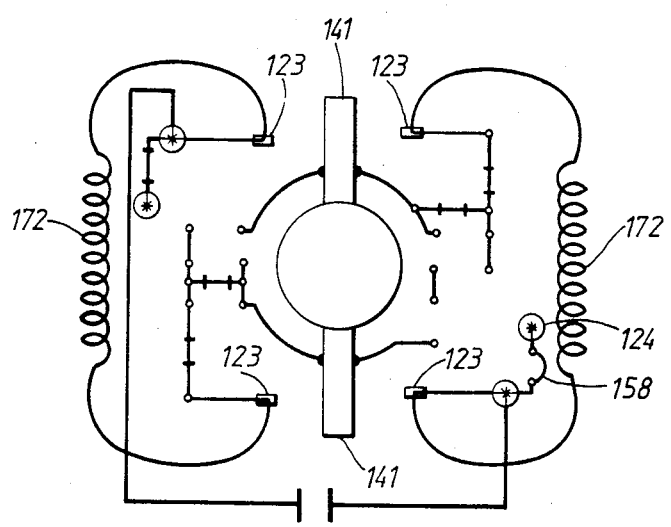

The circuit of the example shown in FIGS. 34 and 35 is identical with that described above with reference to FIGS. 32 and 33 except that to energise the motor the user has to rotate the cam ring 167 using the finger 168 from position POS1 to position POS2 to depress the switch assembly to bring the contact bar thereof into electrical contact with the related exposed parts 166 of the array. Rotation of the cam ring 167 in the opposite direction switches the motor unit off.

If desired, a double pole power switch may be provided by punching out part 174 of the array (FIGS. 23 and 34) and fitting a switch assembly in the associated pocket.

The array 120 can be adapted to provide a degree of control of the speed of the motor by connecting a diode in circuit and by including a switch assembly to short out the diode to give full motor speed.

Figure 36:
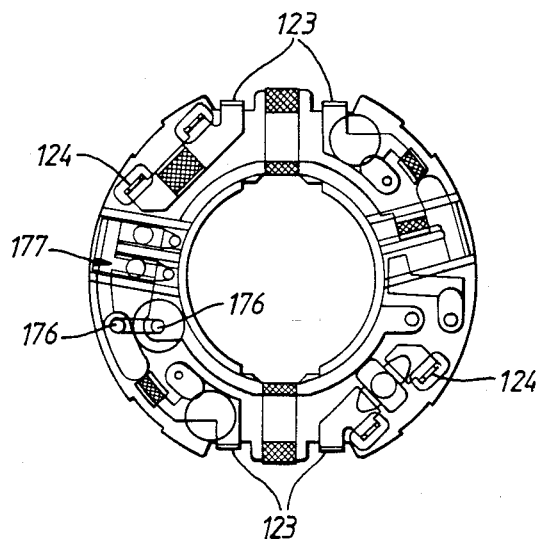

FIG. 36 shows an array 120 adapted to receive a diode 175 that is connected across parts of the array connection of the latter being effected to parts 176 that are exposed on the underneath surface of the brush ring 122. The diode leads are protected by the short tubular extensions 140 referred to above.

Figure 37:
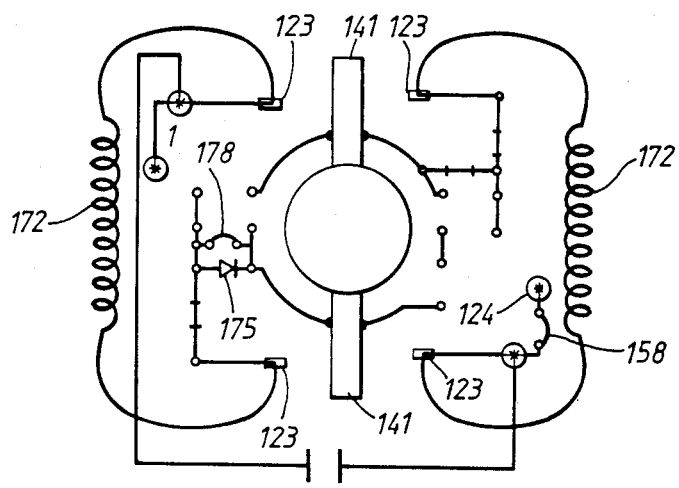

Short circuiting of the diode 175, when required, is effected by the inclusion of a switching assembly in the pocket 177 (FIG. 36), the contact bar of the assembly being shown at 178 (FIG. 37).

The example shown in FIGS. 36 and 37 also includes a single pole switch controlling power input to the motor unit. This is identical with the single pole switch described above with reference to FIGS. 34 and 35.

Rotation of cam ring 167 from position POS 1 to position POS2 energises the motot unit at reduced speed, the diode 175 then being in circuit. Movement of cam ring 167 to position POS3 short circuits the diode and this allows the motor to run at full speed.

Figure 38:
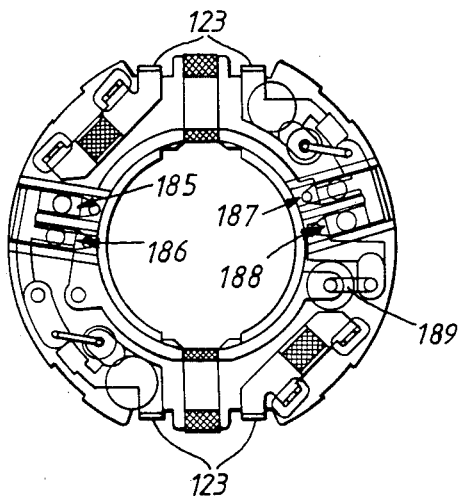
Figure 39:
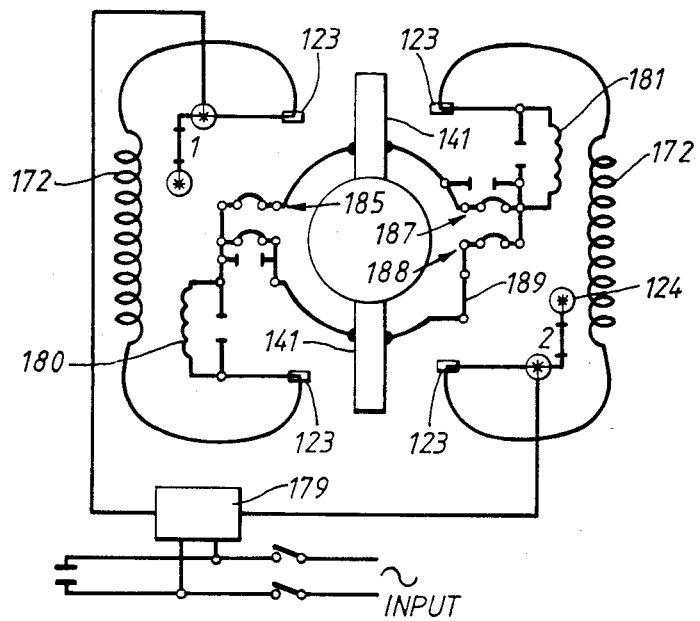

A further set of controls is shown in FIGS. 38 and 39. Control of power supply is effected by a trigger controlled switch on the handle of the tool containing the motor unit so that no power control switches are mounted upon the brush ring. The control includes a reversing ability and a speed control unit shown in FIG. 39 by block 179. The unit is connected in power supply leads to terminals 124 and is housed in the casing of the tool. The unit is user controlled and enables one or other of several different motor speeds to be selected.

The circuit of FIG. 39 also includes suppression chokes 180, 181 that are connected to the array 120 at points 182, 183 (FIG. 25) using parts 129 of the array exposed on the undersurface of the brush ring. To bring the chokes into circuit, it is also necessary to remove parts 184 (FIG. 25) of the array that are exposed through windows 128.

Reversal of the direction of rotation of the motor is provided by switching assemblies located in pockets 185, 186, 187 and 188 (FIG. 38) and by adding a connecting link 189 across connecting points 190 (FIGS. 23 and 24) of the array. Such connecting points are accessible through the upper face of the brush ring and short tubular shields similar to shields 140 but not visible in FIG. 26.

As before, position POS2 of the cam ring 167 is the "OFF" position of the motor unit. Movement of the cam ring 167 to position POS1 applies power to the unit and allows rotation of the motor in a forward direction via a circuit from the speed control unit 179 to left-hand upper connector 123, left-hand field coil 172, lower left connector 123, choke 180, closed switch assembly in pocket 186, lower brush 141, commutator, upper brush 141, closed switch assembly in pocket 187, choke 181, upper right connector 123, right-hand field coil 172, back to the speed control unit 179.

Movement of the cam ring 167 to position POS3 reverses the direction of rotation of the motor by opening the switch assembly in pocket 186, closing that in pocket 185, opening that in pocket 187 and closing that in pocket 188.

Those changes provide a circuit from the speed control unit to the upper left connector 123, left-hand field coil 172, closed switch assembly in pocket 185, upper brush 141, commutator, lower brush 141, closed switch assembly in pocket 188, choke 181, right-hand field coil 172 and back to the speed control unit.

Figure 40:
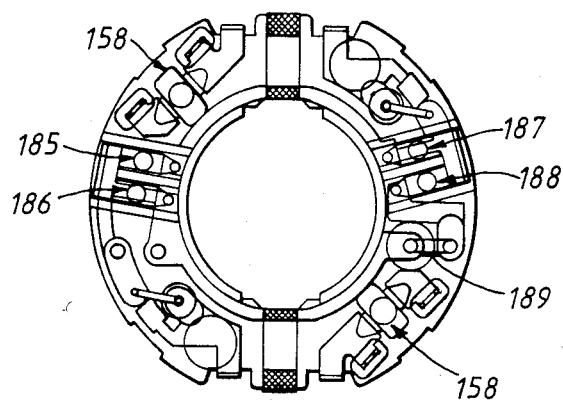
Figure 41:
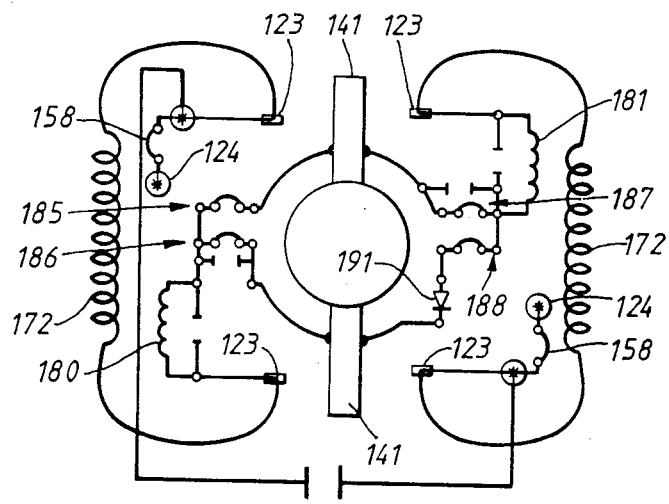

A further variation on the possible motor unit control is shown in FIGS. 40 and 41. The variation includes reversal of rotation, chokes 180, 181, diode 191 effective in the reverse direction of rotation of the motor unit, and double pole power input switch. The rotational speed of the motor in the reverse direction of rotation is restricted by the diode which is connected across points 190 (FIG. 23).

In the forward direction of the motor, the control circuit is energised when the cam ring 167 is moved from its "OFF" position—POS2—to position 1. The circuit can be traced from upper input terminal 124, closed input switch 158, upper left connector 123, left-hand field coil 172, lower left-hand connector 123, choke 180, closed switch assembly in pocket 186, lower brush 141, commutator, upper brush 141, closed switch assembly in pocket 187, choke 181, right-hand field coil 172 and via closed input switch 158 to right-hand input terminal 124.

Movement of the cam ring to position POS3, closes the switch assembly in pocket 185 and opens that in pocket 186, closes switch assembly in pocket 188 and opens that in pocket 187. That action brings diode 191 into circuit and reverses the direction of rotation of the motor unit.

The circuit can be traced from upper input terminal 124, closed input switch 158, left-hand field coil 172, lower left-hand connector 123, choke 180, closed switch assembly in pocket 185, upper brush 141, commutator, lower brush 141, diode 191, closed switch assembly in pocket 187, choke 181, right-hand field coil 172, lower right-hand connector 123, closed input switch 158 and right-hand input terminal 124.

Other combinations of the various circuit components are possible as will be evident to those skilled in the art.

Although it is assumed in the description of the brush ring shown in FIG. 26 that power connections are made to input terminal 24 by means of space terminals, the terminals have apertures 195 to enable screw type terminations to be fixed to the connectors.

The above described embodiments, of course, are not to be construed as limiting the breadth of the present invention. Modifications, and other alternative constructions, will be apparent which are within the spirit and scope of the invention as defined in the appended claims.

What is claimed is:

1. A bearing assembly for a shaft, comprising:
    a mounting sleeve having a longitudinal bore;
    a series of spaced, external, axial, outwardly extending fins on said sleeve;
    a bearing mounted in said bore;
    each of said fins being of a smaller height over one part of its axial length and being of a greater height over another part of its axial length;
    an annular mounting member; and
    a seating for said annular mounting member formed at a junction between said one part and said another part of the axial length of each of said fins 2. The bearing assembly as claimed in claim 1, in which the annular mounting member is of a resilient material.

3. The bearing assembly as claimed in claim 2, in which the bearing mounted in the bore is a bearing sleeve and is an interference fit in the bore.

4. A bearing assembly for a shaft, comprising:
    a mounting member having an orifice;
    a locating surface in the member around the orifice;
    a resilient mounting member seated upon the locating surface;
    a mounting sleeve having a longitudinal bore;
    a series of external, axial, outwardly-extending fins on said sleeve;
    said fins each having a reduced height over one part of their axial length and a greater height over another part of their axial length with a junction formed on each of said fins between said one part and said another part;
    a seating surface for said resilient mounting member formed by said junction on each said fin;
    a bearing mounted in the bore.

5. An electric motor assembly, comprising:
    a stator with end faces;
    a rotor including a shaft and rotatable about a longitudinal axis;
    first and second end caps seated upon the end faces, said first end cap including an orifice aligned with said axis;
    a locating surface in said first end cap around the orifice;
    a resilient mounting member seated upon the locating surface;
    a mounting sleeve having a longitudinal bore;
    a series of external, axial, outwardly extending fins on said sleeve;
    each of said fins being of a reduced height over one part of its axial length and of a greater height over another part of its axial length, a junction being defined on each said fin between said one part and said another part;
    a seating surface for said resilient mounting member formed by said fins at said junction on each of said fins; and
    a bearing sleeve supporting one end of the shaft, said bearing sleeve being located in the bore.

6. An electric motor assembly, comprising: a stator defining a central longitudinal axis; an armature having a shaft extending along said axis, said shaft being rotatable on said axis;
    a bearing in which said shaft is journalled;
    a heat sink having a bore therein, said bearing being disposed in said bore;
    said heat sink comprising a sleeve having a plurality of external fins extending outwards with respect to said axis; and
    an armature mounting member in which said heat sink is supported via a ring, said ring encircling and seating against said fins and spacing said heat sink from said armature mounting member.

7. The electric motor assembly of claim 6, wherein said fins each have a greater height over one portion of a length thereof in a direction parallel to said axis and a smaller height over another portion of the length thereof in said direction, said ring encircling and contacting said another portion of each said fin.

8. The electric motor assembly of claim 7, wherein a junction is formed between said one portion and said another portion of the length of each said fin, and said ring seats against said junction.

9. The electric motor assembly of claim 8, wherein said armature mounting member has a boss defining an aperture therein, an internal contour of said boss forming an outer seating against which said ring seats.

10. The electric motor assembly of claim 6, wherein said ring is made of resilient material.

11. The electric motor assembly of claim 10, wherein said ring comprises an "O" ring.

12. The electric motor assembly of claim 6, wherein said fins extend axially parallel to said axis, said fins have an axial length parallel to said axis, and said ring seats against said fins intermediate the axial length thereof.

13. The electric motor assembly of claim 6, wherein said fins are formed with curved portions forming a first seating for said ring, and said armature mounting member is formed with a rounded seat forming a second seating for said ring, said first and second seatings locating said ring therebetween.

14. The electric motor assembly of claim 6, wherein said fins extend radially outwards with respect to said axis.

15. The electric motor assembly of claim 6, wherein said armature mounting member comprises an end housing of electrically insulating material mounted on an end of said stator, said end housing having an aperture therethrough, and said ring being seated against an internal surface of said aperture.

16. The electric motor assembly of claim 6, wherein said heat sink is a light alloy casting.

* * * * *